US012767056B2

(12) United States Patent
Werner et al.

(10) Patent No.: US 12,767,056 B2
(45) Date of Patent: Oct. 20, 2026

(54) STORAGE DEVICE FOR A LUGGAGE COMPARTMENT OF A MOTOR VEHICLE

(71) Applicant: MERCEDES-BENZ GROUP AG, Stuttgart (DE)

(72) Inventors: Martin Werner, Stuttgart (DE); Michael Gunsch, Leutenbach (DE); Jochen Bisinger, Esslingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 216 days.

(21) Appl. No.: 18/864,107

(22) PCT Filed: Mar. 24, 2023

(86) PCT No.: PCT/EP2023/057688
§ 371 (c)(1),
(2) Date: Nov. 8, 2024

(87) PCT Pub. No.: WO2023/217452
PCT Pub. Date: Nov. 16, 2023

(65) Prior Publication Data

US 2025/0303970 A1 Oct. 2, 2025

(30) Foreign Application Priority Data

May 10, 2022 (DE) ..................... 10 2022 001 649.4

(51) Int. Cl.
*B60R 5/04* (2006.01)

(52) U.S. Cl.
CPC .............. *B60R 5/045* (2013.01); *B60R 5/044* (2013.01)

(58) Field of Classification Search
None
See application file for complete search history.

(56) References Cited

U.S. PATENT DOCUMENTS 4,479,675 A * 10/1984 Zankl ...................... B60R 5/044 296/37.16
6,231,096 B1 5/2001 Bollmann et al.
(Continued)

FOREIGN PATENT DOCUMENTS

DE 29819322 U1 3/1999
DE 10028735 A1 1/2002
(Continued)

OTHER PUBLICATIONS

International Search Report and Written Opinion mailed Jun. 29, 2023 in related/corresponding International Application No. PCT/EP2023/057688.
(Continued)

*Primary Examiner* — Joseph D. Pape
(74) *Attorney, Agent, or Firm* — PATENT PORTFOLIO BUILDERS PLLC

(57) ABSTRACT

A storage device for a luggage compartment of a motor vehicle includes a frame dividing the luggage compartment. The storage device is pivotable out of a substantially horizontal horizontal position about a pivot axis into an angled angular position. The frame has a cover foldable about a folding axis by hinge elements and is moveable between a position arranged at an angle to the frame and a placement position in which it is supported on the frame and in which the cover is configured in the horizontal position of the frame for the placement items for transportation.

16 Claims, 5 Drawing Sheets

(56) References Cited

U.S. PATENT DOCUMENTS

| | | | |
|---|---|---|---|
| 6,406,083 B2 | 6/2002 | Bharj et al. | |
| 7,762,602 B2 | 7/2010 | Bohlke et al. | |
| 10,160,381 B1 * | 12/2018 | Hernandez Covarrubias .............. | B60Q 1/0035 |
| 10,787,128 B2 * | 9/2020 | Ngo ........................ | B60R 5/044 |
| 2002/0000734 A1 * | 1/2002 | Bharj ...................... | B60R 5/044 296/37.16 |

FOREIGN PATENT DOCUMENTS

| | | |
|---|---|---|
| DE | 202007016318 U1 | 2/2008 |
| DE | 102016203807 A1 | 10/2016 |
| EP | 3009303 A1 | 4/2016 |
| FR | 2870495 A1 | 11/2005 |
| GB | 2519426 A | 4/2015 |

OTHER PUBLICATIONS

Office Action created Nov. 23, 2022 in related/corresponding DE Application No. 10 2022 001 649.4.

* cited by examiner

STORAGE DEVICE FOR A LUGGAGE COMPARTMENT OF A MOTOR VEHICLE

BACKGROUND AND SUMMARY OF THE INVENTION

Exemplary embodiments of the invention relate to a storage device for a luggage compartment of a motor vehicle.

With luggage compartments of motor vehicles, in particular of passenger cars, it has hitherto been difficult to stow small or less robust objects securely and in so doing to make full use of the whole luggage compartment. To counter this, the luggage compartment or a volume of the luggage compartment is segmented accordingly. It is also important to enable the loaded item to be protected from view and stored safely, the fastening of all objects located in the luggage compartment also being important. For example, shelf-like systems and roller shutter systems which allow a certain load are therefore preferred for segmenting.

DE 100 28 735 A1 has already disclosed a frame which can be inserted, in particular temporarily, in a trunk. The size of the frame is adapted for a horizontal alignment of the frame within the trunk opening such that the frame surrounds the trunk opening as completely as possible. Individual parts can be inserted into the frame as desired. Together with insert parts inserted into the frame, a horizontal lid of the trunk is provided at the top. The lid also serves to divide the trunk into two areas on top of each other that can be loaded separately.

U.S. Pat. No. 6,231,096 B1 discloses a luggage compartment lid for a luggage compartment of a motor vehicle, in particular of an estate car, which has at least one inherently rigid covering element which, in an approximately horizontal covering position approximately parallel to the luggage compartment floor, separates the luggage compartment of the vehicle from the vehicle passenger compartment and can be pivoted from the covering position about a pivot axis upwards into an unloading position. The pivot axis of the covering element extends approximately in the longitudinal direction of the vehicle. Two covering elements are provided that can be pivoted about corresponding pivot axes of hinges which extend along the lateral sides of the luggage compartment. The hinges are detachable and the covering elements are configured to form a portable case when removed from the vehicle.

U.S. Pat. No. 7,762,602 B2 discloses a device for stowing objects in a luggage compartment of a motor vehicle with a storage container that can be attached in the luggage compartment of the motor vehicle, the storage container having a bearing surface and an at least partially deformable wall, the height of the wall being able to be changed at least in sections by an adjusting device comprising at least one winding shaft, the adjusting device having at least one detachable fixing device and a rotary movement of the at least one winding shaft being able to be blocked for transport by the detachable fixing device, so that at least an extension of the wall is prevented during transport, and/or the adjusting device comprises a pull-out limiting device by which a maximum pull-out movement of the at least one winding shaft is limited.

Other relevant publications are GB 2 519 426 A1, U.S. Pat. No. 4,479,675 A1 and DE 29819 322 U1.

Exemplary embodiments of the invention are directed to refining a storage device such that practical use may be made of the whole luggage compartment, in particular on two levels.

One aspect of the invention relates to a storage device for a luggage compartment of a motor vehicle, in particular of a passenger car. The storage device comprises a frame that divides the luggage compartment and on which further components are arranged and/or can be arranged for configuration of the storage device. The frame can be pivoted here from a substantially horizontal horizontal position about a pivot axis into an angled angular position. A length and a width of the frame correspond substantially to the width and the depth of the luggage compartment, as a result of which, in the horizontal position, the frame also provides a second level within the luggage compartment in addition to a floor of the luggage compartment. The frame therefore extends between the respective side walls as well as between the rear seat and a tailgate of the motor vehicle. This makes it possible to divide the luggage compartment in terms of height, meaning that loaded items can be placed both on the floor of the luggage compartment and on the level provided by the frame, depending on the configuration. The components of the storage device can be arranged or are already arranged on the frame here, depending on the user's wishes, it being provided that the frame has at least one floor-shaped surface on which a transport item can be placed. By separating the luggage compartment, the volume of the luggage compartment is divided into two spaces, making it possible to stack several items for transportation on both levels and in both spaces separately from one another. In particular, the storage device is located in a middle area of the height of the luggage compartment, this not impairing a field of vision for a driver of the motor vehicle. In other words, the storage device represents a central surface of the luggage compartment. In order to detachably fasten the storage device, it has, for example, connecting elements that are configured by respective pins and corresponding openings and which, in particular, enable the frame and thus the storage device to be latched or fastened to the side walls of the luggage compartment. It is important here that a mechanism of the connecting elements allows the storage device to be removed from the luggage compartment again if desired.

According to the invention, the frame has a cover that can be folded about a folding axis and by means of hinge elements and can be moved between a position arranged at an angle to the frame and a placement position supported on the frame. In this placement position, the cover is configured for the placement of items for transportation in the horizontal position of the frame. In other words, the cover is configured to cooperate with the frame and to cooperate with at least one crossbar of the frame in the horizontal position of the frame for placement of the items for transportation. The frame has here at least one crossbar that extends from front to rear in the longitudinal direction of the vehicle and is, in particular, in a central region of the frame. The crossbar hereby stabilizes the frame and enables a higher load-bearing capacity, as the weight of the items for transportation on the storage device is thus better distributed. The cover is fastened to a front edge of the frame in the longitudinal direction of the vehicle by means of the hinge elements in such a way that the frame can be rotated upwards about the folding axis. This allows a user standing in front of the luggage compartment to ergonomically lift the cover and access the interior of the storage device. When the cover is closed, it rests on the crossbar and on the frame, so that the load of the items for transportation placed on the cover is distributed over the surface. The flexibility of the cover depends here on the number of crossbars as well as on the material of the cover. Depending on the OEM's specifications, the cover is stabilized here and thus a higher load is achieved through the configuration of the frame and the configuration of the cover.

Furthermore, it is provided that the connecting elements are configured as a pair of lock latches with corresponding pins on the respective side walls that can be latched into one another and that form the pivot axis. In other words, the pair is formed by respective lock latches arranged on the frame and corresponding pins arranged on the respective side walls, wherein the lock latches can be latched onto the respective pins and thus form the pivot axis. Above all, a lock latch with a corresponding pin enables the connecting elements to be latched quickly and easily so that a user can fasten the storage device in the luggage compartment with a quick movement of the hand. Furthermore, it is provided that in a rear region in the longitudinal direction of the vehicle the frame can be inserted on respective lateral bearing surfaces on the respective side walls until the connecting elements engage and can be placed onto these in the horizontal position. It is provided here that the respective side walls are configured in such a way that they form the bearing surfaces, which, in particular, hold the load of the storage device. For example, the bearing surfaces are made of a soft material to avoid scratches and damage, for example, as well as to allow the storage device to be inserted. This means that the storage device can be inserted onto the bearing surfaces by means of the frame until the connecting elements engage. This helps the user to insert the storage device more easily. It is also possible to use the side walls to distribute the weight of the storage device and the objects lying on it along the side wall. It is also possible to arrange rolling elements, for example, on the frame or the storage device in order to at least partially simplify the pushing movement of the storage device until it engages.

An advantageous configuration of the invention provides that the cover has at least one additional surface that can be folded out and that has its own folding axis and respective hinge elements. This surface can therefore be regarded as a second cover on the original cover, which can be folded out independently of the original cover. This makes it possible to access a smaller part of the storage device without having to open the entire cover. For example, items for transportation that are not on the surface that can be folded out can be placed on the cover, thus enabling the surface and the second cover to be opened or folded out. This allows a user to access the objects within the storage device without having to move the items for transportation in question from where they are. In particular, it is provided here that the folding axis of the surface that can be folded out extends along an elongated extension direction of the cover and is formed substantially axially to the folding axis of the cover. A distance between the two folding axes defines here the width of the surface that can be folded out, this allowing a placement surface to be defined depending on the application and specifications of the OEM. The placement surface and the surface that can be folded out together essentially make up the entire surface of the cover. Finally, it is also possible to provide a multitude of surfaces that can be folded out with respective folding axes and hinge elements, as a result of which the cover is segmented and respective surfaces are accessible to the user.

In a further advantageous configuration of the invention, it is provided that on its inner circumference the frame has a continuous projection which, with the at least one crossbar, forms a bearing surface for the cover. The projection is configured here at a predetermined height that corresponds, in particular, to the height of the crossbar. This creates the bearing surface on which the cover rests when closed. The thickness of the cover corresponds here to a difference in height between the height of the frame and the height of the crossbar. According to the invention, it is provided that the cover rests on the bearing surface and thus an upper level of the cover forms part of the surface formed by the frame. This means that the cover forms part of the bearing surface of the storage device and the cooperation of the frame and the crossbar with the cover forms the placement surface for the items for transportation.

In a further advantageous configuration of the invention, it is provided that a handle for holding the storage device is configured on the frame. The handle can be configured here, for example, by an arch made of the same material arranged on the frame, as a result of which the frame with the arch provides an opening through which a hand of the user can grasp the storage device. The arch extends here into the space of the storage device so that the frame continues to rest against the tailgate on the outer circumference. In particular, a height of the handle corresponds to the height of the frame, the cover being configured with a recess corresponding to the handle. This still results in a continuous bearing surface on the storage device. In addition, it is also possible to configure other similar handles analogous to the handle in order to improve a handling of the storage device.

In addition, a configuration of the invention in which the cover has a locking device is particularly advantageous. This means, in particular, that the cover does not fold out when adjusted to the angular position and all objects do not fall out of the storage device. Likewise, the locking device means that if the storage device is dismantled, the user can remove it from the luggage compartment without the objects inside falling out. Finally, the locking device allows dangerous tools or substances to be locked away, which, for example, keeps children safe.

A further configuration of the invention has proven to be advantageous in which the frame can be detachably fastened to the respective side walls in the angular position by means of respective fastening elements. The fastening elements are configured here as pins that are arranged on the respective side walls and protrude from a respective level of the side walls. The storage device is rotated forwards accordingly about the pivot axis, whereby the fastening elements stop further rotation by a predetermined angle and provide support to the storage device. This means that although the storage device can be folded forwards, it is not held in place by a backrest of a rear seat, for example, but rather by the fastening elements. It is also possible to attach fastening elements to different areas of the respective side walls, which allows the angle of the angular position to be varied. In particular, the fastening elements are detachable here so that the user can remove them as desired. It is also possible to attach such fastening elements to the storage device, in particular to the frame, wherein the side walls have corresponding receptacles for these fastening elements. In other words, the storage device is configured in such a way that it can rotate upwards about the pivot axis and thus pivot into the angular position. In order to detachably fasten the storage device in the angular position, the fastening elements of the storage device are configured here to detachably fasten the storage device by means of receptacles on the respective side walls in the angular position. By pivoting or folding the storage device from the horizontal position to the angular position, it is possible to use the full height of the luggage compartment. By pivoting into the horizontal position, the luggage compartment is divided accordingly. In particular, the storage device is configured in such a way that, in the angular position, it does not impair a field of vision of the driver of the motor vehicle.

In a further advantageous configuration of the invention, it is provided that at least one insert and one floor are arranged on the frame. In particular, the two components are detachably fastened to the frame, various connection options being possible here, for example screw elements, Velcro fasteners and/or others. For example, the floor is fastened to the frame by means of screw elements so that it supports various objects that are inserted into or placed into the storage device. The at least one insert is inserted into a volume created by a height of the frame and the floor, its main task being to provide small spaces within the volume in which various objects can be arranged. The configuration of such an insert can vary in such a way that, for example, carrying boxes, tools and/or other objects can be fastened therein. It is also possible to insert different inserts with different shapes into the frame and the floor, which allows the use of the storage device to be varied as desired. Due to the components arranged on the frame, namely the floor, the at least one insert and the cover, it is possible to accommodate or stow various objects that are small relative to the luggage compartment in the storage device so that they are not stored freely in the luggage compartment, thus enabling them to be transported in a safe and orderly manner.

In addition, a further configuration of the invention has proven advantageous in which the connecting elements are divided into at least two corresponding pairs, the first pair being arranged in a front region of the frame in the longitudinal direction of the vehicle and the second pair being arranged in a rear region of the frame in the longitudinal direction of the vehicle. The respective pairs thus form respective axes, the two pairs being configured to hold the storage device in the horizontal position and to support the weight of the storage device and the elements or objects placed on the storage device. By using two pairs, it is particularly advantageous to use the first front pair as a pivot axis and the second rear pair as a support axis of the storage device.

Finally, in a further advantageous configuration of the invention, it is provided that the frame is made of aluminum or another lightweight material, and the insert, the cover, and the floor are made of a lightweight pressed fiber material. The frame provides the necessary stability here and allows the other components to be fastened to it, for example using screw elements. The frame can be configured to be hollow or made of a flat plate here, depending on the specified load-bearing capacity of the storage device. The insert, the cover and the floor can be made of lightweight pressed fiber material, allowing cost-effective production. In particular, the insert is thereby easy to change, allowing for multiple uses and multiple configurations of the insert.

In other words, the invention provides a narrow cassette or storage device that can be engaged on the side walls in the area of the luggage compartment. This has an insert under a lid that can be folded out or under the cover, which can hold either two folding boxes or, in another exemplary configuration, four water crates. For transporting large/bulky goods, the storage device can either be rotated into the vertical position in the vehicle at different angles, thus ensuring that the load is secure. Alternatively, the storage device can easily be removed completely from the vehicle. For smaller loading scenarios, such as shopping, the folding boxes, for example, contained in the storage device can be conveniently loaded using what is referred to as a “flip window” without the large tailgate always having to be opened. Vans or box-type vehicles with large luggage compartments in particular benefit from such a solution.

Particularly advantageous are intuitive operation, easy installation and removal, a symmetrical, harmonious shape, low system complexity, and space-saving storage and parking. The storage device is accordingly lightweight, handy and flat, in particular seven centimeters high, can be loaded underneath with six folding boxes, and there are also compartments for two folding boxes and small items, or alternatively compartments for four water crates or other compartments are possible. Finally, the storage device can be folded up, in particular, by 65 degrees to 90 degrees, analogously to the inclination of the backrest.

Further advantages, features and details of the invention will become apparent from the following description of preferred exemplary embodiments and from the drawings. The features and feature combinations specified in the description above and the features and feature combinations mentioned in the description of the figures and/or shown in the figures alone below can be used not only in the combination specified in each case, but also in other combinations or on their own without falling outside the scope of the invention.

BRIEF SUMMARY OF THE DRAWING FIGURES

In the figures.

In the figures, elements and functionally identical elements are given the same reference numerals.

DETAILED DESCRIPTION

Figure 1:
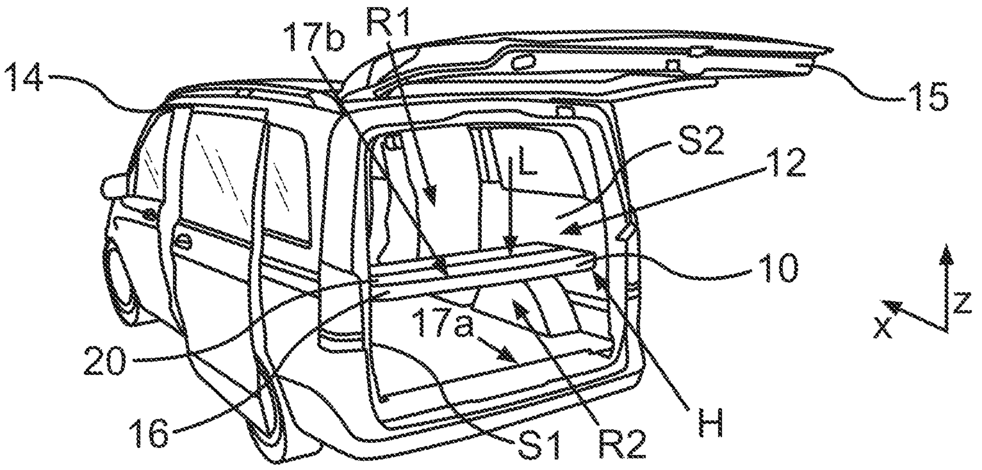
FIG. 1 shows a first schematic perspective view of a first embodiment of a storage device according to the invention for a luggage compartment of a motor vehicle when fitted and in a horizontal position.
Figure 2:
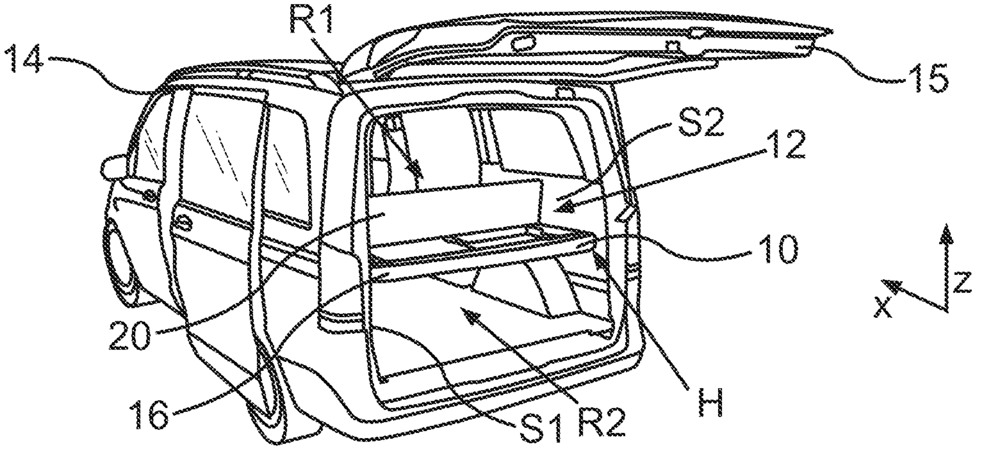
FIG. 2 shows a second schematic perspective view of the embodiment of the storage device according to the invention with an open cover.
Figure 3:
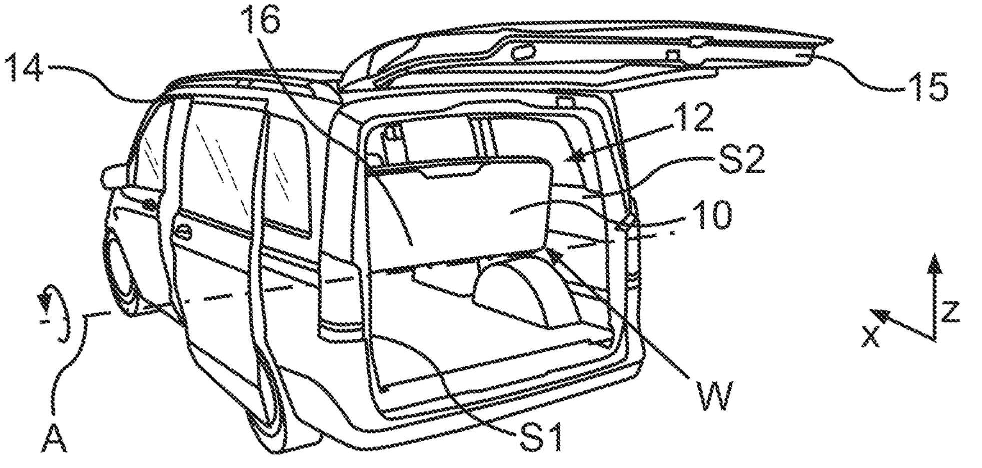
FIG. 3 shows a third schematic perspective view of the embodiment of the storage device according to the invention when fitted, but in an angular position.

FIGS. 1 to 3 show respective perspective views of a storage device 10 according to the invention for a luggage compartment 12 of a motor vehicle 14 with an open tailgate 15 when the storage device 10 is fitted within the luggage compartment 12. The storage device 10 comprises a frame 16 that divides the luggage compartment 12 and on which further components are arranged and/or can be arranged for the configuration of the storage device 10. The frame 16 can be pivoted here from a substantially horizontal horizontal position H about a pivot axis A into an angled angular position W and forwards in the longitudinal direction of the vehicle x. A length and a width of the frame 16 correspond substantially to the width and the depth of the luggage compartment 12, as a result of which, in the horizontal position H, the frame 16 provides a second level 17*b* within the luggage compartment 12 in addition to a floor 17*a* of the luggage compartment 12. The frame 16 therefore extends between respective side walls S1, S2 as well as between a rear seat and the tailgate 15 of the motor vehicle 14. This makes it possible to divide the luggage compartment 12 in terms of height, meaning that items to be loaded can be placed both on the floor 17*a* of the luggage compartment 12 and on the level 17*b* provided by the frame 16.

FIGS. 1 and 2 show here the storage device 10 in the substantially horizontal horizontal position H, as a result of which the luggage compartment 12 of the motor vehicle 14 is divided by the storage device 10 into an upper space R1 in the vertical direction of the vehicle z and a lower space R2 in the vertical direction of the vehicle z. While FIG. 1 depicts the storage device 10 with a closed cover 20, FIG. 2 shows the storage device 10 with a cover 20 that is folded out, so it is possible to see inside the storage device 10. This shows that the storage device 10 is intended to accommodate smaller objects within the storage device 10 or to secure them.

Due to the angular position W shown in FIG. 3, it is possible to use the whole luggage compartment 12 or the full height of the luggage compartment 12 without removing the storage device 10 and thus the objects located within the storage device 10 from the motor vehicle 14. When the cover 20 is closed, it rests on the frame 16 so that a load L of items for transportation placed on the cover 20 is distributed over the surface. Examples of the use of the storage device 10 according to the invention can be seen in FIGS. 10-12.

Figure 4:
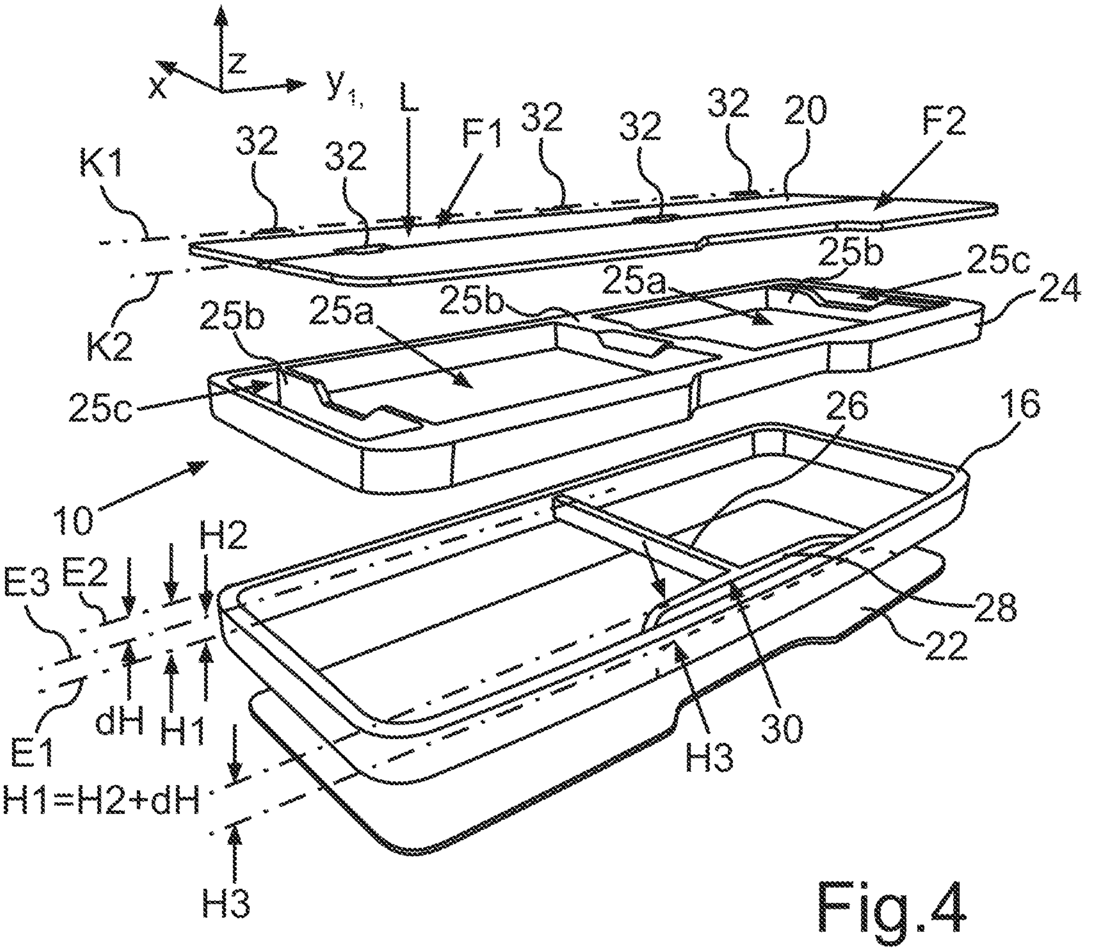
FIG. 4 shows an exploded view of the embodiment of the storage device according to the invention with further components.

FIG. 4 shows an exploded view of the embodiment of the storage device 10 according to the invention, in which the frame 16, a floor 22, an insert 24, and the cover 20, in particular a cover 20 that can be folded out and that covers substantially the entire frame 16, are shown. It can be seen in particular here that the floor 22 can be fastened to a lower frame level E1 of the frame 16. This fastening can be implemented here, for example, by means of screw elements and/or other fastening elements. The frame 16 itself has here a crossbar 26 that is arranged in a central region of the frame 16 in the longitudinal extension direction y1 of the storage device 10 and is fastened to a front region of the frame 16 in the longitudinal direction of the vehicle x. In the rear region of the crossbar 26, an arch 28 is formed that is fastened to the frame 16 and that in turn is connected to the crossbar 26. The arch 28 itself is connected to the frame 16 via two connection points, wherein according to the invention it is provided that the frame 16, the arch 28, and the crossbar 26 are formed in one piece. The arch 28 is directed forward in the longitudinal direction of the vehicle x and forms a handle 30 for holding the storage device 10.

In other words, the frame 16 consists of the crossbar 26 and the arch 28, which represents the stability of the storage device 10. Depending on the configuration of the frame 16, a possible load can be supported by the storage device 10. In particular, a height H2 of the crossbar 26 does not correspond to the total height H1 of the frame 16, so it is possible to place the insert 24 as well as the cover 20 on the crossbar 26 without the insert 24 and the cover 20 exceeding the total height H1 of the storage device 10 or the frame 16. The crossbar 26 forms a bearing surface for the cover 20, which is located on a crossbar level E3. This creates the bearing surface on which the cover 20 in a closed state and the insert 24 rest. The thickness of the cover 20 with the insert 24 corresponds here to a height difference dH between the total height H1 of the frame 16 and the height H2 of the crossbar 26. According to the invention, the cover 20 rests on the bearing surface. An upper cover level E4 of the cover 20 therefore forms part of a surface formed by the frame 16 and thus part of an upper frame level E2. This means that the cover 20 therefore forms part of the bearing surface of the storage device 10 and the cooperation of the frame 16 and the crossbar 26 with the cover 20 and the insert 24 forms the placement surface for the items for transportation.

A height H3 of the arch 28, however, corresponds to the total height H1 of the frame 16, thus forming the handle 30. Alternatively, the height H3 of the arch 28 is equal to the height H2 of the crossbar 26, it being possible for the insert 24 and the cover 20 also to be placed on the arch 28 without exceeding the total height H1 of the frame 16 overall. The insert 24 is configured such that it can be inserted into the frame. The crossbar 26 supports here the center of the insert 24, it also being possible for the insert 24 to be placed on the floor 22. The floor 22 and the crossbar 26 therefore support the insert 24 so that the objects placed on the insert 24 and thus in the storage device 10 do not fall through. It is also possible to insert several inserts 24 instead of one insert 24, it being possible for the configurations of the respective inserts 24 to be adapted depending on the OEM's specifications.

In particular, in the embodiment shown in FIG. 4, an insert 24 is formed in which two folding boxes 24*a* in the folded state can be inserted into areas 25*a* provided for this purpose. The two areas 25*a* for the folding boxes 24*a*, in particular, are delimited by walls 25*b*, two further spaces 25*c* for further objects being shown. Finally, FIG. 4 also shows the cover 20 can be foldably fastened to the frame 16. The cover 20 is formed here from at least two foldable surfaces F1, F2, which can be folded out about a respective folding axis K1, K2 by means of respective hinge elements 32.

Figure 5:
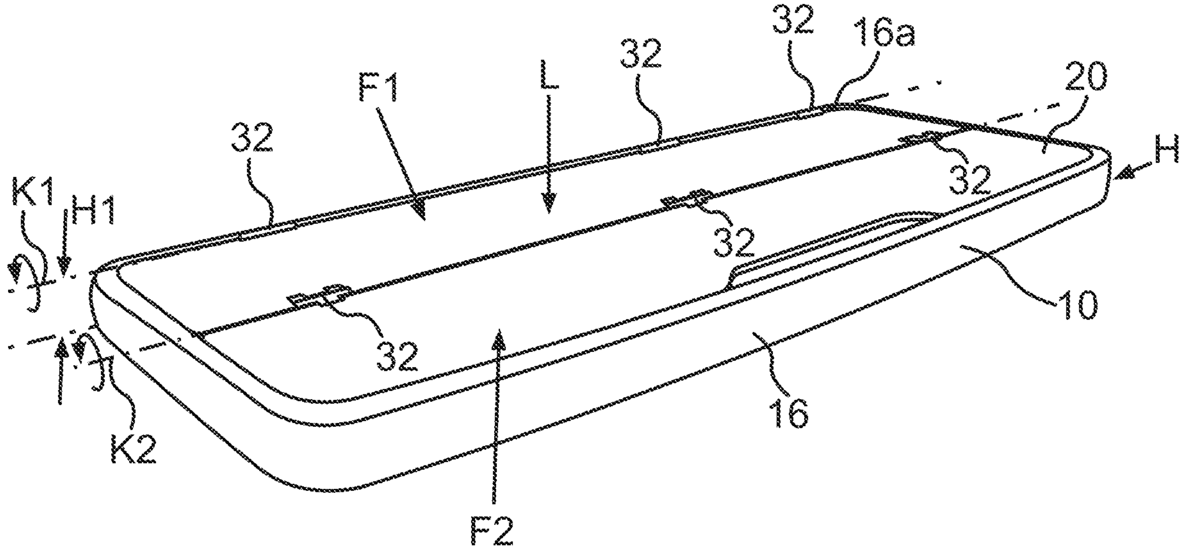
FIG. 5 shows a schematic perspective view of the embodiment of the storage device fitted together according to the invention with a closed cover in the horizontal position.

FIG. 5 shows a schematic perspective view of the embodiment of the storage device 10 according to the invention in the horizontal position H and with a closed cover 20, in particular the two foldable surfaces F1, F2 of the cover being shown here. In addition, it can be seen here that the entire surface of the cover 20 does not exceed the total height H1 of the frame 16, thereby representing a transition that is, in particular, smooth. According to the invention the frame 16 has the cover 20 that can be folded about the first folding axis K1 and by means of the hinge elements 32 and which, in cooperation with the frame 16 and in cooperation with the crossbar 26 (not shown in FIG. 5), is configured in the horizontal position H for placing items for transportation. The crossbar 26 hereby stabilizes the frame 16 and allows a higher load L, as the load L of the items for transportation on the storage device 10 is correspondingly distributed. The cover 20 is fastened to a front edge 16*a* of the frame 16 in the longitudinal direction of the vehicle x by means of the hinge elements 32 in such a way that the cover can be rotated about the first folding axis K1. This allows a user standing in front of the luggage compartment 12 to ergonomically lift the cover 20 and access the interior of the storage device 10. When the cover 20 is closed, it therefore rests on the crossbar 26, the insert 24 and on the frame 16, so that the load L of the items for transportation placed on the cover 20 is distributed over the surface. It is provided according to the invention that the frame 16 is made of aluminum or another lightweight material. The insert 24, the cover 20, and the floor 22 are made here of a lightweight material of pressed fibers.

Figure 6:
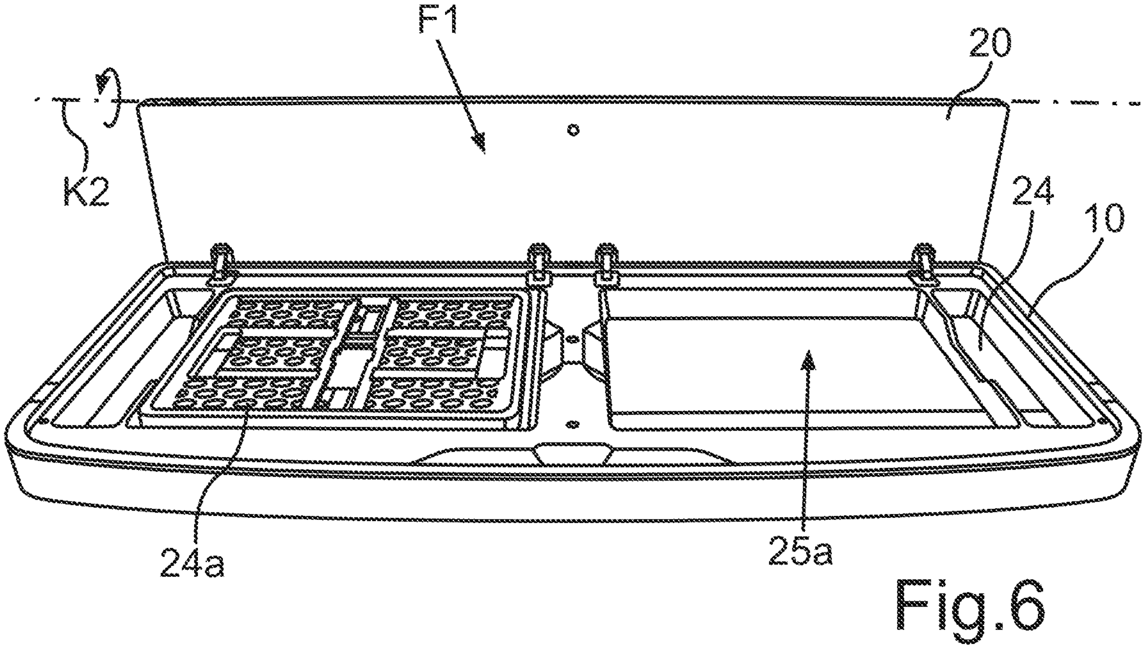
FIG. 6 shows a further schematic perspective view of the embodiment of the storage device according to the invention in the horizontal position and with a cover which is folded out.

FIG. 6 shows a perspective view of the embodiment of the storage device 10 according to the invention with the cover 20 folded out, making it possible, in particular, to see into the insert 24. The insert 24 has here the areas 25*a* for the objects, it being possible, in particular, to insert two folding boxes 24*a*. Also included here are the hinge elements which are required for folding out the cover 20. The second foldable surface F2 is folded about the second folding axis K2 so that only the first foldable surface F1, in particular a lower region of the cover 20, is shown.

Figure 7:
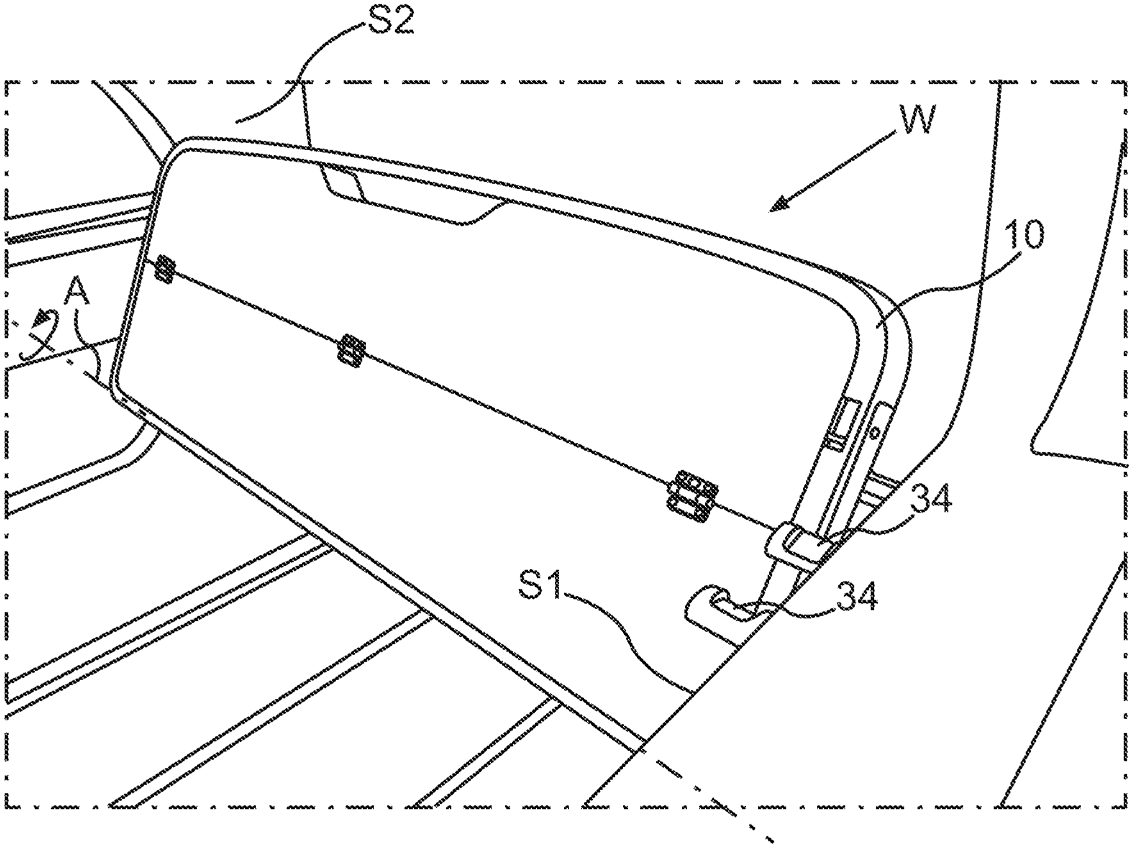
FIG. 7 shows a perspective view of the embodiment of the storage device according to the invention in the angular position.

FIG. 7 shows a perspective view of the embodiment of the storage device 10 according to the invention in the angular position W within the luggage compartment 12. The frame 16 can be detachably fastened to the respective side walls S1, S2 in the angular position W by means of respective fastening elements 34. The fastening elements 34 are configured here as pins that are arranged on the respective side walls S1, S2 and protrude from a respective level of the side walls S1, S2. The storage device 10 is rotated forwards accordingly about the pivot axis A, whereby the fastening elements 34 stop further rotation by a predetermined angle and provide support to the storage device 10. It is also possible to attach fastening elements 34 to different areas of the respective side walls S1, S2, which allows the angle of the angular position W to be varied. In particular, the fastening elements 34 are detachable here so that the user can remove them as desired.

Figure 8:
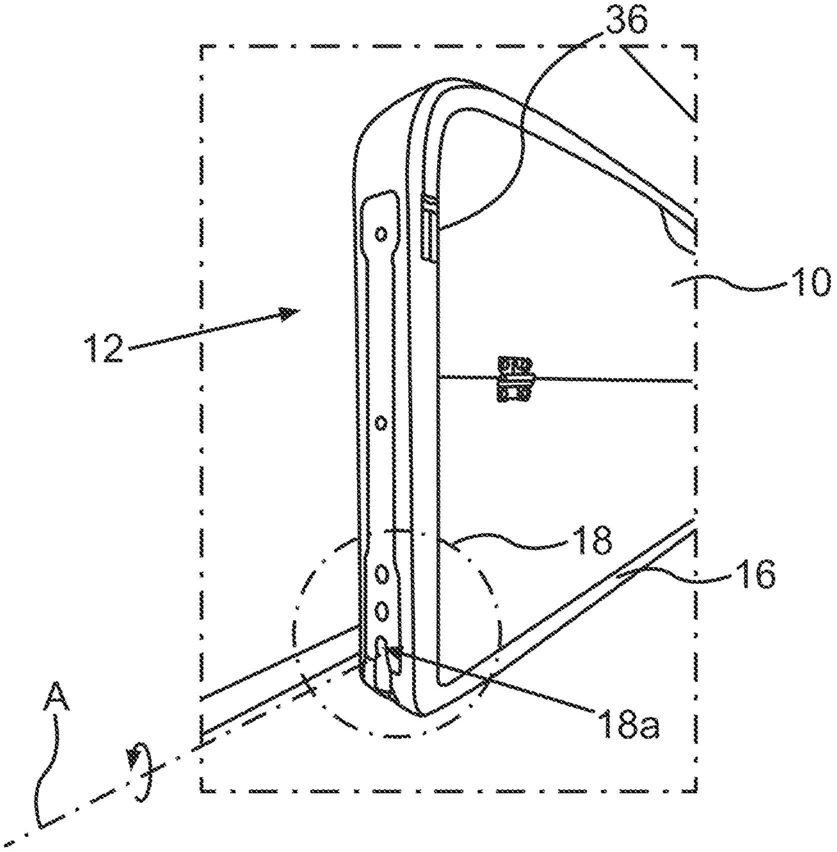
FIG. 8 shows a further perspective view of the embodiment of the storage device according to the invention focusing on a connecting element.

FIG. 8 shows a further perspective view of the embodiment of the storage device 10 according to the invention focusing on the connecting elements 18. The storage device 10 has here a connecting element 18 that forms the lock latch 18*a* and can be latched with a corresponding pin 18*b* (not shown). The connecting element 18 therefore forms the pivot axis A. In other words, the storage device 10 has such connecting elements 18 that are configured by respective pins 18*b* (not shown in FIG. 8) and corresponding openings or lock latches 18*a*, and which in particular enable the frame 16 and thus the storage device 10 to be latched or fastened to the side walls S1, S2 of the luggage compartment 12. It is important here that a mechanism of the connecting elements 18 allows the storage device 10 to be removed from the luggage compartment 12 again if desired. To open the lock latch 18*a* again, a lock 36 is shown here that has a mechanism by means of which the lock latch 18*a* is opened and the pin 18*b* is released. Thus, when the lock latch 18*a* engages in the pin 18*b*, it is possible to open it again by the mechanism. When the lock latch 18*a* engages with the pin 18*b*, it is possible to fold or adjust the storage device 10 about the pivot axis A so that the storage device 10 is pivoted from the horizontal position H into the angular position W.

Figure 9:
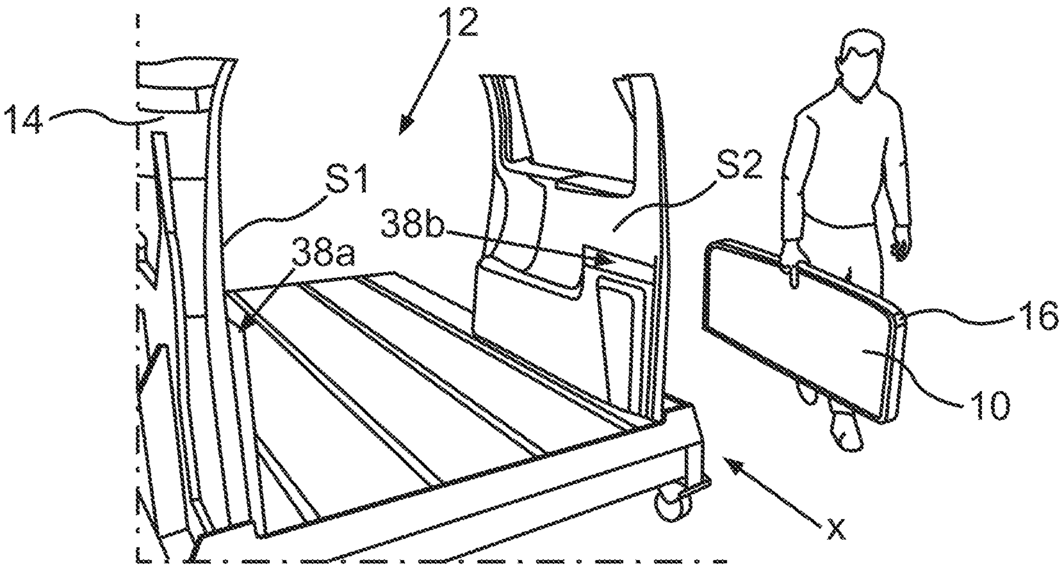
FIG. 9 shows a schematic perspective view of a user with the storage device according to the invention outside the motor vehicle.

FIG. 9 shows a schematic representation of a storage device 10 held by a user as well as a luggage compartment

12 of a prototype of a motor vehicle 14 with the respective side walls S1, S2. It can be seen in particular here that respective bearing surfaces 38*a*, 38*b* are provided on the respective side walls S1, S2, along which the frame 16 of the storage device 10 is inserted until the connecting elements 18 engage. This enables, in particular, the frame 16 to be placed on the bearing surfaces 38*a*, 38*b* so that the weight of the storage device 10 as well as of the objects located therein and the objects placed on the storage device 10 is distributed over the respective bearing surfaces 38*a*, 38*b*. In other words, it is provided according to the invention that in a rear region in the longitudinal direction of the vehicle x the frame 16 can be inserted on respective lateral bearing surfaces 38*a*, 38*b* on the respective side walls S1, S2 until the connecting elements 18 engage and can be placed onto these in the horizontal position H. It is also provided here that the respective side walls S1, S2 are configured in such a way that they form the bearing surfaces 38*a*, 38*b*, which, in particular, hold the load L of the storage device 10. For example, the bearing surfaces 38*a*, 38*b* are made of a soft material to avoid scratches and damage, for example, as well as to allow the storage device 10 to be inserted.

Figure 10:
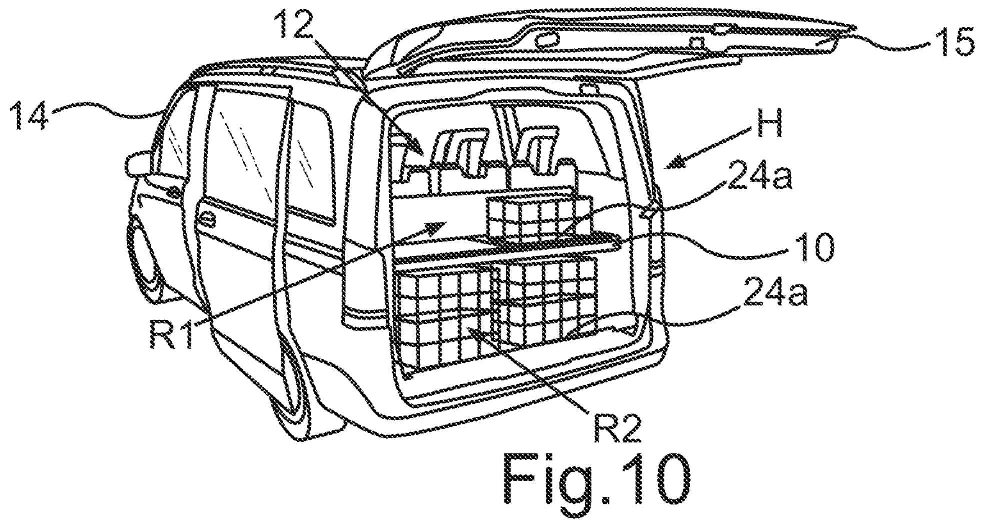
FIG. 10 shows a first schematic perspective view of the storage device according to the invention in the horizontal position during use.
Figure 11:
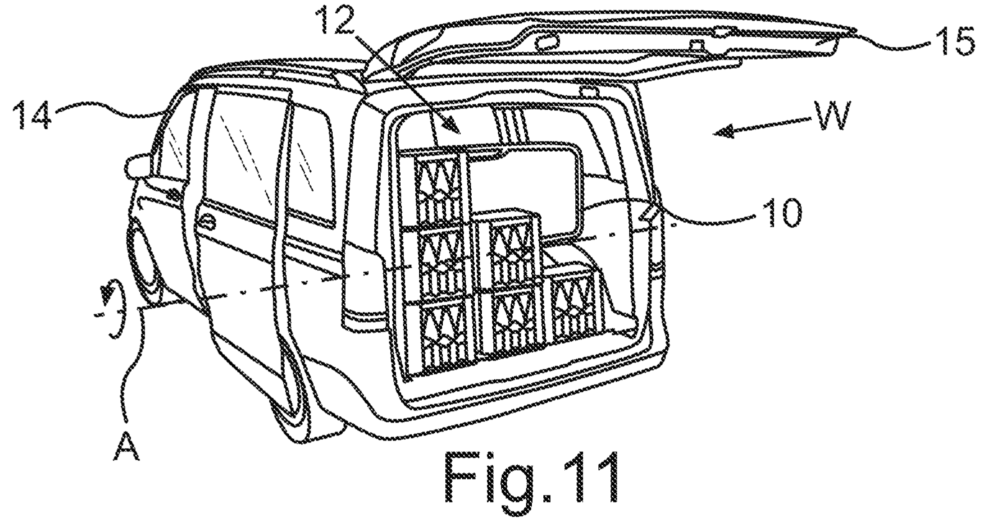
FIG. 11 shows a further schematic perspective view of the storage device according to the invention in the vertical position within the motor vehicle, likewise during use.
Figure 12:
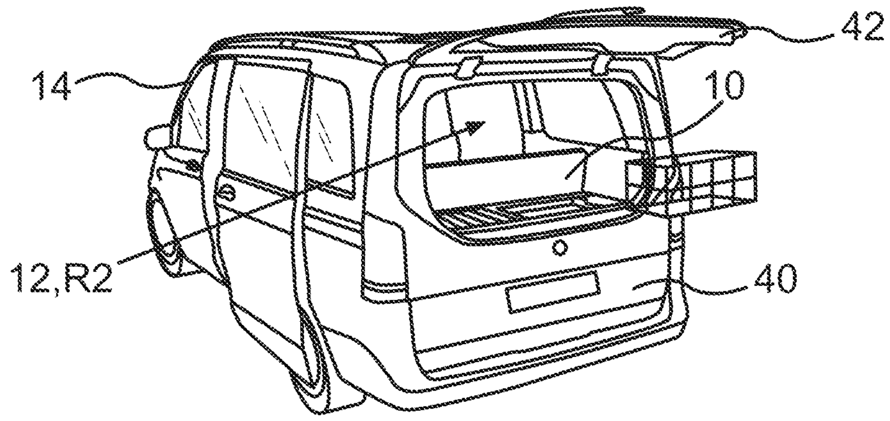
FIG. 12 shows a further schematic perspective view of the storage device according to the invention in a motor vehicle with the tailgate closed but the rear window open.

FIGS. 10 to 12 show respective schematic perspective views of the storage devices 10 according to the invention within the motor vehicle 14 while in different usage positions. The motor vehicle 14 has an open tailgate 15 here. FIG. 10 therefore shows the storage device 10 in the horizontal position H with folding boxes 24*a* located in the lower space R2 and at least one folding box 24*a* located on the storage surface and thus in the upper space R1. This shows in particular the possible segmentation of objects within the luggage compartment 12.

FIG. 11 shows in particular the storage device 10 in the vertical position V, it therefore being possible to use the full height of the luggage compartment 12. For example, crates of bottles can be stacked here in this way, the storage device 10 not preventing stacking. Accordingly, the storage device 10 can remain in the motor vehicle 14 without dividing the luggage compartment 12.

Finally, FIG. 12 shows a further embodiment of the motor vehicle 14 in which the tailgate 15 is closed, but a window 42 of the tailgate 15 is shown folded out or in an open state. The storage device 10 makes it possible to provide a higher surface through the storage surface on which objects can be placed. In addition, access to the interior of the storage device 10 is possible by folding out the cover 20. This means that the tailgate 15 does not have to be opened to load items into the luggage compartment 12 or into the upper space R2, thereby increasing convenience for the user.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A storage device for a luggage compartment of a motor vehicle, the storage device comprising:

a frame dividing the luggage compartment and pivotable out of a horizontal position about a pivot axis into an angled angular position, wherein the frame has a cover foldable about a folding axis by hinge elements, wherein the cover is moveable between a position arranged at an angle to the frame and a placement position in which the cover is supported on the frame and in which the cover is configured in the horizontal position of the frame to allow placement of items for transportation, wherein the storage device further comprises a pair of lock latches, wherein the pair of lock latches correspond with pins in respective side walls of the motor vehicle, wherein the pair of lock latches are latchable to the pins and form the pivot axis, wherein, in a rear region in a longitudinal direction of the motor vehicle, the frame is insertable on respective lateral bearing surfaces on the respective side walls until the pair of lock latches elements engage with the pins and the frame is placeable onto the respective lateral bearing surfaces in the horizontal position.

2. The storage device of claim 1, wherein the cover has at least one additional surface foldable out and having its own folding axis.

3. The storage device of claim 1, wherein, on an inner circumference of the frame, the frame has a continuous projection which, with at least one crossbar, forms a bearing surface for the cover.

4. The storage device of claim 1, further comprising:

a handle arranged on the frame, wherein the handle is configured for holding the storage device.

5. The storage device of claim 1, wherein the cover has a locking device.

6. The storage device of claim 1, wherein the frame is detachably fastenable to the respective side walls in the angular position by respective fastening elements.

7. The storage device of claim 1, further comprising:

an insert arranged on the frame; and a floor on which the frame is arranged.

8. The storage device of claim 7, wherein the frame is made of aluminum, and wherein the insert, the cover, and the floor comprise a lightweight material made of pressed fibers.

9. A motor vehicle comprising:

a luggage compartment having a respective sidewalls; and a storage device detachably arranged in the luggage compartment, wherein the storage device comprises a frame dividing the luggage compartment and pivotable out of a horizontal position about a pivot axis into an angled angular position, wherein the frame has a cover foldable about a folding axis by hinge elements, wherein the cover is moveable between a position arranged at an angle to the frame and a placement position in which the cover is supported on the frame and in which the cover is configured in the horizontal position of the frame to allow placement of items for transportation, wherein the storage device further comprises a pair of lock latches, wherein the pair of lock latches correspond with pins in the respective side walls, wherein the pair of lock latches are latchable to the pins and form the pivot axis, wherein, in a rear region in a longitudinal direction of the motor vehicle, the frame is insertable on respective lateral bearing surfaces on the respective side walls until the pair of lock latches elements engage with the pins and the frame is placeable onto the respective lateral bearing surfaces in the horizontal position.

10. The motor vehicle of claim 9, wherein the cover has at least one additional surface foldable out and having its own folding axis.

11. The motor vehicle of claim 9, wherein, on an inner circumference of the frame, the frame has a continuous projection which, with at least one crossbar, forms a bearing surface for the cover.

12. The motor vehicle of claim 9, wherein the frame further comprises a handle arranged on the frame, wherein the handle is configured for holding the storage device.

13. The motor vehicle of claim 9, wherein the cover has a locking device.

14. The motor vehicle of claim 9, wherein the frame is detachably fastenable to the respective side walls in the angular position by respective fastening elements.

15. The motor vehicle of claim 9, wherein the storage device further comprises:

an insert arranged on the frame; and a floor on which the frame is arranged.

16. The motor vehicle of claim 15, wherein the frame is made of aluminum, and wherein the insert, the cover, and the floor comprise a lightweight material made of pressed fibers.

* * * * *